United States Patent [19]
Mellon

[11] Patent Number: 5,833,219
[45] Date of Patent: Nov. 10, 1998

[54] HYDRAULIC ANTIVIBRATION DEVICE

[75] Inventor: Paul Mellon, Chateaudun, France

[73] Assignee: Hutchinson, Paris, France

[21] Appl. No.: 889,686

[22] Filed: Jul. 8, 1997

[30] Foreign Application Priority Data

Jul. 12, 1996 [FR] France ................................ 96 08747

[51] Int. Cl.⁶ .................................................. F16F 5/00
[52] U.S. Cl. ................................. 267/140.13; 267/219
[58] Field of Search ...................... 267/140.11, 140.13, 267/141.1–141.7, 219; 180/300, 312

[56] References Cited

U.S. PATENT DOCUMENTS

| | | | |
|---|---|---|---|
| 4,570,911 | 2/1986 | Konishi ................................ | 267/219 |
| 4,711,206 | 12/1987 | Andra et al. ........................ | 123/192.1 |
| 4,852,864 | 8/1989 | Bitchkus et al. ..................... | 267/219 |
| 4,896,867 | 1/1990 | Schyboll et al. .................... | 267/140.13 |
| 4,921,232 | 5/1990 | Hofmann ............................. | 267/219 |
| 4,986,510 | 1/1991 | Bellamy et al. ..................... | 248/562 |
| 5,028,038 | 7/1991 | de Fontenay ........................ | 267/140.13 |
| 5,060,917 | 10/1991 | DuBos et al. ...................... | 267/140.13 |
| 5,344,127 | 9/1994 | Hetller et al. ....................... | 267/219 |

FOREIGN PATENT DOCUMENTS

| | | |
|---|---|---|
| 0 209 883 A2 | 1/1987 | European Pat. Off. . |
| 0 278 054 A1 | 8/1988 | European Pat. Off. . |
| 0 306 752 A2 | 3/1989 | European Pat. Off. . |
| 0 307 741 A2 | 3/1989 | European Pat. Off. . |
| 0 346 227 A1 | 12/1989 | European Pat. Off. . |
| 0 354 381 A2 | 2/1990 | European Pat. Off. . |
| 0 354 381 B1 | 2/1990 | European Pat. Off. . |
| 0 409 707 A1 | 1/1991 | European Pat. Off. . |
| 0 286 527 A1 | 10/1998 | European Pat. Off. . |
| 2 536 143 | 5/1984 | France . |
| 2 714 947 A2 | 7/1995 | France . |
| 37 31 479 | 4/1989 | Germany . |

*Primary Examiner*—Robert J. Oberleitner
*Assistant Examiner*—Chris Schwartz
*Attorney, Agent, or Firm*—Marshall, O'Toole, Gerstein, Murray & Borun

[57] ABSTRACT

The invention relates to a hydraulic antivibration device having two rigid strength members interconnected by an elastomer body forming a working chamber and a compensation chamber which communicate via a narrow passage formed by two circularly-arcuate channels connected in series. The two channels are formed by two respective grooves formed in the two faces of a rigid body, the grooves being at least partially closed by two annular bearing surfaces clamped axially against opposite faces of the rigid body.

7 Claims, 1 Drawing Sheet

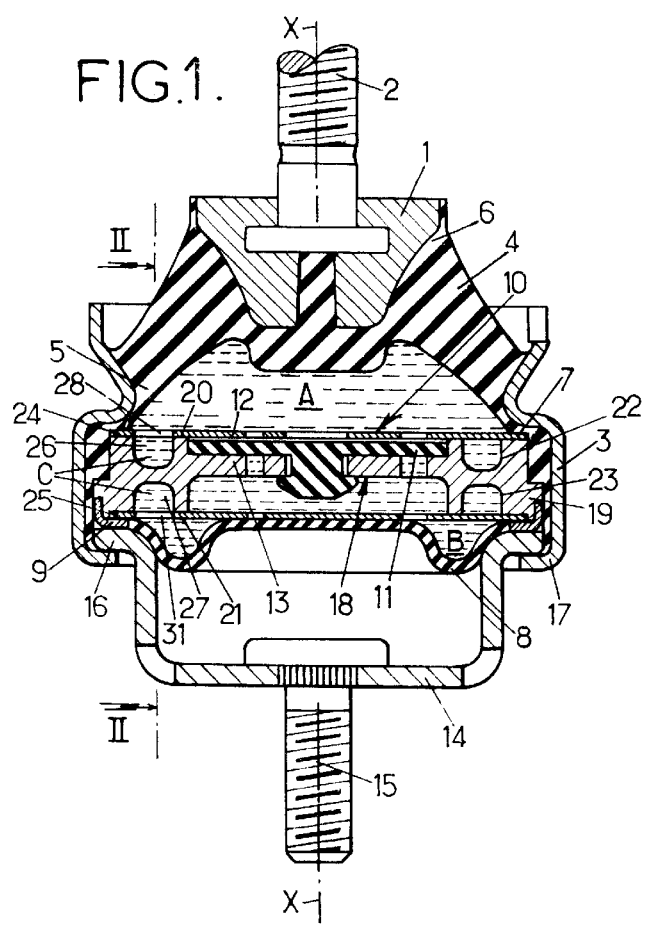
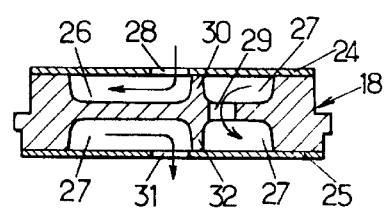
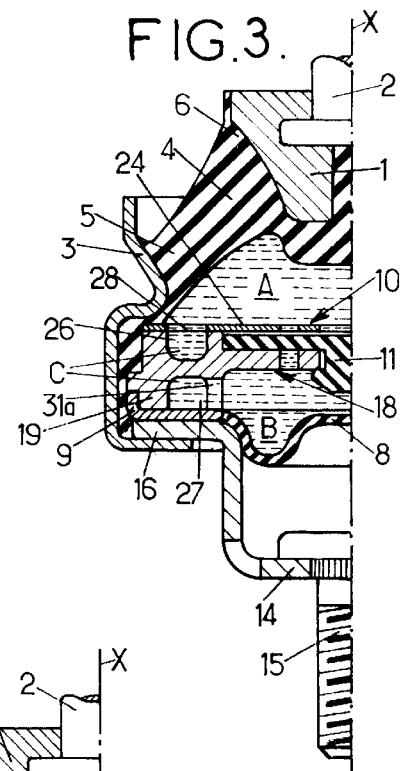
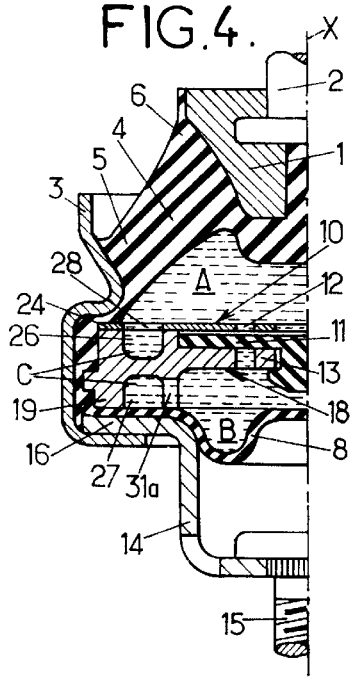
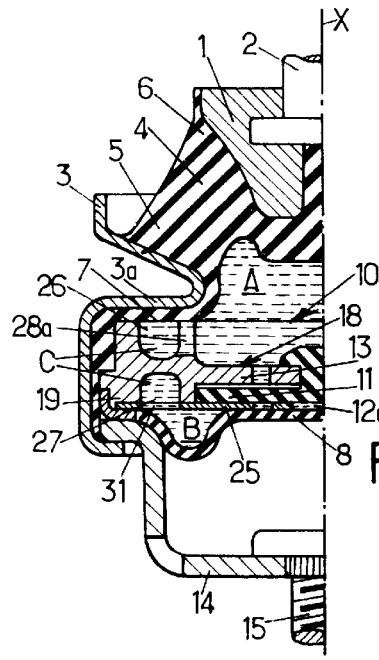

HYDRAULIC ANTIVIBRATION DEVICE

FIELD OF THE INVENTION

The present invention relates to hydraulic antivibration devices designed to be interposed for linking and damping purposes between two rigid elements such as a vehicle chassis and an engine.

More particularly, amongst such devices, the invention relates to those which comprise:

first and second rigid strength members suitable for connecting respectively to the two rigid elements that are to be united;

an elastomer body that is substantially bell-shaped, extending about a central axis between a top secured to the first strength member and an annular base secured to the second strength member;

a working chamber partially defined by the elastomer body;

a compensation chamber partially defined by an easily-deformable elastomer wall;

a narrow passage putting the two chambers into communication with each other, the two chambers and the narrow passage being filled with liquid;

a decoupling flap disposed between the two chambers, said flap having two radially-extending faces each in communication with a respective one of the two chambers, and said flap being movable through a small amount of clearance parallel to the central axis; and a rigid partition separating the two chambers and in sealed contact with the annular base of the elastomer body, said partition having an open central portion closed by the flap and a peripheral portion which defines the narrow passage, which narrow passage extends angularly around the central axis over a circumferential length greater than the perimeter of the rigid partition and includes both a first channel situated in a plane close to the working chamber and a second channel situated in a plane close to the compensation chamber, the first channel extending over a circular arc between a first end in communication with the working chamber and a second end in communication with the second channel, and the second channel itself extending over a circular arc between a first end in communication with the second end of the first channel and a second end in communication with the compensation chamber.

BACKGROUND OF THE INVENTION

Such a hydraulic antivibration device is disclosed, for example, in document FR-A-2 714 947.

Known devices of that type give satisfaction, however they suffer from the drawback of having a partition that includes two rigid shells constituted by metal castings, each of the shells including a single circularly-arcuate groove which defines one of the narrow passage channels.

The presence of those two castings which are relatively heavy and expensive tends to increase both the overall weight and the overall cost of the antivibration device.

OBJECTS AND SUMMARY OF THE INVENTION

A particular object of the present invention is to mitigate that drawback.

To this end, according to the invention, in a hydraulic antivibration device of the kind in question the narrow passage is defined by a single rigid shell belonging to the rigid partition, said rigid shell having a thick peripheral edge which includes first and second opposite faces in which first and second grooves extending over circular arcs are respectively hollowed out, the first and second faces of the peripheral edge of the rigid shell facing axially respectively towards the working chamber and towards the compensation chamber, and said two faces being axially clamped in sealed contact between first and second annular bearing surfaces secured to the second strength member, said first and second annular bearing surfaces axially closing at least in part the first and second grooves respectively, thereby forming the first and second channels of the narrow passage.

By means of these dispositions, only one rigid cell is required for defining both the first and the second narrow passage channels, in co-operation with two annular bearing surfaces which can be constituted by parts that are very simple such as plane washers or plates, or which can even be constituted by annular surfaces of certain parts of the hydraulic antivibration device that do not specifically form portions of the partition separating the two chambers from each other.

The antivibration device of the invention is thus both lightweight and low cost.

In preferred embodiments, it is possible to use one or more of the following dispositions:

the rigid shell is a metal casting;

the rigid shell includes, in the center of its thick peripheral edge, a grid which partially defines a flap housing containing the decoupling flap, which decoupling flap is held captive in the housing by a first substantially plane rigid plate having an open central portion in coincidence with the decoupling flap and a peripheral portion constituting one of the two annular bearing surfaces clamped axially against the peripheral edge of the rigid shell;

the device further includes a second substantially plane rigid plate which likewise forms one of the two annular bearing surfaces axially clamped against the peripheral edge of the rigid shell, the first and second rigid plates being disposed on either side of the rigid shell;

the second annular bearing surface is constituted by a metal washer secured to the periphery of the elastomer wall defining the compensation chamber;

the second strength member has an annular radial rim which is axially clamped against the second face of the thick peripheral edge of the rigid shell, thereby constituting the second annular bearing surface, the elastomer wall which defines the compensation chamber also including a peripheral zone which is interposed between said second annular bearing surface and the second face of the peripheral edge of the rigid shell; and the annular base of the elastomer body has a shoulder which constitutes the first annular bearing surface.

BRIEF DESCRIPTION OF THE DRAWING

Other characteristics and advantages of the invention appear from the following detailed description of various embodiments, given as non-limiting examples and with reference to the accompanying drawing.

In the drawing:

FIG. 1 is an axial section view of a hydraulic antivibration device constituting a first embodiment of the invention;

FIG. 2 is a section view on line II—II of FIG. 1; and

FIGS. 3 to 5 are axial half-section views of three variants of the device of FIG. 1.

DETAILED DESCRIPTION OF THE DRAWINGS

In the various figures, the same references designate elements that are identical or similar.

Also, in the description below, terms such as "up", "down", "bottom", "top", "vertical", and "horizontal" are used solely to make the description simpler and clearer, and they refer to the normal position of use of the device of the invention, but such terms are not limiting.

The hydraulic antivibration device shown in FIGS. 1 and 2 comprises, in conventional manner:

a rigid metal seat 1 secured to an adjacent metal bolt 2 extending upwards on a vertical axis X;

a rigid metal ring 3 centered on the axis X;

an elastomer body 4 which connects the seat 1 and the ring 3 together in sealed manner, being bonded to these two parts, the elastomer body being bell-shaped extending about the axis X between an annular base 5 secured to the ring 3 and a top 6 secured to the seat 1, the elastomer body being constituted by a wall that is thick enough to have good axial compression strength so as to act as a support when the seat 1 is connected, for example, to a portion of a motor vehicle engine, while the ring 3 is connected to the chassis of the vehicle, and the annular base 5 of the elastomer body forms at least one annular shoulder 7 that is directed axially downwards;

a thin and flexible bellows 8 made of elastomer and connected in sealed manner to the ring 3, co-operating with said ring and the elastomer body 4 to define a closed housing, the periphery of the bellows 8 in the example under consideration being overmolded on a rigid metal washer 9;

a rigid metal partition 10 extending horizontally and subdividing the housing into two chambers, a working chamber A adjacent to the elastomer body 4 and a compensation chamber B adjacent to the bellows 8;

a narrow passage C permanently interconnecting the chambers A and B, the narrow passage being formed in the periphery of the intermediate partition 10, the two chambers and the narrow passage being filled with a liquid, the narrow passage C enabling liquid to be transferred between the chambers A and B when the seat 1 and the ring 3 are subjected to relative axial motion at low frequency (e.g. at a frequency of less than 20 Hz), that is of large amplitude (e.g. greater than 0.5 mm), such vibratory motion thus being damped by the channel C;

a "decoupling" flap 11 for absorbing axial vibration of relatively large frequency (e.g. greater than 20 Hz) and small amplitude (less than 0.5 mm) between the seat 1 and the ring 3, the flap being constituted by a small plate of elastomer mounted with small axial clearance between two grids 12 and 13 formed in the center of the intermediate partition 10 so that the amplitude of axial displacement of the flap is limited to a small value, e.g. about 0.5 mm, the flap 11 being in sealing contact against one or other of the grids 12 and 13 when it is in abutment thereagainst; and a rigid metal cap 14 covering the bellows 8 to protect it and secured to an adjacent bolt 15, the cap 14 including a radial annular rim 16 which is clamped axially against the partition 10 by crimping the bottom end 17 of the ring 3, the washer 9 being axially interposed between the partition 10 and the rim 16.

According to the invention, the narrow channel C is defined by a single rigid shell 18 belonging to the rigid partition 10, said rigid shell advantageously being a casting, e.g. of aluminum, or a part molded of plastics or other material.

The rigid shell has a thick periphery edge 19 which itself includes first and second faces 20 and 21 that are axially directed respectively towards the working chamber A and the compensation chamber B.

In the first and second faces 20 and 21 there are formed respective first and second grooves 22 and 23 each extending angularly over an arc of a circle around the axis X.

Also, the rigid shell 18 is disposed between first and second plane rigid metal plates 24 and 25 which are disposed respectively in contact with the working chamber A and with the compensation chamber B, the assembly comprising the rigid shell 18 and the two plates 24 and 25 being axially compressed between the shoulder 7 formed at the base of the elastomer body 4 and the rim 16 of the cap 14, held in place by crimping the bottom portion 17 of the ring 3.

The first rigid plate 24 includes the above-mentioned grid 12 in its central portion and the periphery of said plate 24 forms an annular bearing surface which is pressed in sealed contact against the first face 20 of the thickened edge 19 of the rigid shell, co-operating with the first groove 22 to define a first annular channel 26.

Similarly, the second plate 25 has an opening in its center to put the flap 11 into communication with the compensation chamber B, and the periphery of this plate is pressed in sealing contact against the second face 21 of the edge 19 of the rigid shell, co-operating with the second groove 23 to define a second annular channel 27.

The first channel 26 extends angularly over an arc of a circle from a first end in communication with the working chamber A via an orifice 18 formed through the plate 24 and a second end in communication with the second channel 27 via an orifice 29 formed in the rigid shell 18, the first and second ends of the first channel 26 being separated from each other by a radial partition 30 forming a part of the rigid shell 18.

Similarly, the second channel 27 extends angularly over an arc of a circle between a first end in communication with the orifice 29 and a second end in communication with the compensation chamber B via an orifice 31 formed in the plate 25, said first and second ends being separated by a radial partition 32 forming a portion of the rigid shell 18.

Because of these dispositions, it is possible to obtain a narrow passage C of great length simply and cheaply, which passage can extend angularly over more than one complete turn, and over up to nearly two turns.

It is thus possible to obtain maximum damping at a relatively low frequency referred to as the "tuned frequency" where the tuned frequency is inversely proportion to the length of the narrow passage C.

It will be observed that the second end of the channel 27 could optionally communicate with the compensation chamber B via a radial orifice (similar to the orifice 31a in FIGS. 3 and 4) in addition to the orifice 31.

In the variant embodiments shown in FIGS. 3 to 5, the hydraulic antivibration device is similar to the device secured above with reference to FIGS. 1 and 2, such that the devices are not described in detail again. Only the differences between these variant embodiments and the embodiment shown in FIGS. 1 and 2 are therefore described below.

In the variant shown in FIG. 3, the antivibration device differs from the device of FIGS. 1 and 2 merely by the fact that the plate 25 is omitted, the channel 27 being closed axially by the washer 9 which is secured to the periphery of the bellows 8, and the second end of the channel 27 communicates with the compensation chamber B via an orifice 31a that opens radially inwards.

In the variant shown in FIG. 4 the antivibration device is formed in the same manner as in the variant of FIG. 3 with the exception that the metal washer 9 is omitted, the channel 27 being axially closed by the rim 16 of the cap 14, and the periphery of the bellows 8 is interposed and axially clamped between said rim 16 and the periphery 19 of the rigid shell 18.

Finally, in the variant shown in FIG. 5, the antivibration device differs from the device of FIGS. 1 and 2 in the following particulars:

the rigid plate 24 is omitted;

the flap 11 is held captive between the grid 13 and a grid 12a formed in the center of the rigid plate 25;

the channel 26 is closed axially by the shoulder 7 of the elastomer body, which shoulder is held clamped axially against the periphery 19 of the rigid shell by a radial wall 3a belonging to the ring 3; and the first end of the channel 26 communicates with the working chamber A via an orifice 28a that opens radially inwards into the chamber A.

It will be observed that instead of using a flap constituted by a free piece of elastomer, as described above, it is also possible to use an elastomer flap whose periphery is bonded to the partition 10, with the displacements of the flap then being obtained by means of its flexibility.

I claim:

1. A hydraulic antivibration device for interposing between two rigid elements, and comprising:

first and second rigid strength members suitable for connecting respectively to the two rigid elements that are to be united;

an elastomer body that is substantially bell-shaped, extending about a central axis between a top secured to the first strength member and an annular base secured to the second strength member;

a working chamber partially defined by the elastomer body;

a compensation chamber partially defined by an easily-deformable elastomer wall;

a narrow passage putting the two chambers into communication with each other, the two chambers and the narrow passage being filled with liquid;

a decoupling flap disposed between the two chambers, said flap having two radially-extending faces each in communication with a respective one of the two chambers, and said flap being movable through a small amount of clearance parallel to the central axis; and a rigid partition separating the two chambers and in sealed contact with the annular base of the elastomer body, said partition having an open central portion closed by the flap and a peripheral portion which defines the narrow passage, which narrow passage extends angularly around the central axis over a circumferential length greater than the perimeter of the rigid partition and includes both a first channel situated in a plane close to the working chamber and a second channel situated in a plane close to the compensation chamber, the first channel extending over a circular arc between a first end in communication with the working chamber and a second end in communication with the second channel, and the second channel itself extending over a circular arc between a first end in communication with the second end of the first channel and a second end in communication with the compensation chamber;

wherein the narrow passage is defined by a single rigid shell belonging to the rigid partition, said rigid shell having a thick peripheral edge which includes first and second opposite faces in which first and second grooves extending over circular arcs are respectively hollowed out, the first and second faces of the peripheral edge of the rigid shell facing axially respectively towards the working chamber and towards the compensation chamber, and said two faces being axially clamped in sealed contact between first and second annular bearing surfaces secured to the second strength member, said first and second annular bearing surfaces axially closing at least in part the first and second grooves respectively, thereby forming the first and second channels of the narrow passage.

2. A device according to claim 1, in which the rigid shell is a metal casting.

3. A device according to claim 1, in which the rigid shell includes, in the center of its thick peripheral edge, a grid which partially defines a flap housing containing the decoupling flap, which decoupling flap is held captive in the housing by a first substantially plane rigid plate having an open central portion in coincidence with the decoupling flap and a peripheral portion constituting one of the two annular bearing surfaces clamped axially against the peripheral edge of the rigid shell.

4. A device according to claim 3, further including a second substantially plane rigid plate which likewise forms one of the two annular bearing surfaces axially clamped against the peripheral edge of the rigid shell, the first and second rigid plates being disposed on either side of the rigid shell.

5. A device according to claim 1, in which the second annular bearing surface is constituted by a metal washer secured to the periphery of the elastomer wall defining the compensation chamber.

6. A device according to claim 1, in which the second strength member has an annular radial rim which is axially clamped against the second face of the thick peripheral edge of the rigid shell, thereby constituting the second annular bearing surface, the elastomer wall which defines the compensation chamber also including a peripheral zone which is interposed between said second annular bearing surface and the second face of the peripheral edge of the rigid shell.

7. A device according to claim 1, in which the annular base of the elastomer body has a shoulder which constitutes the first annular bearing surface.

* * * * *